July 19, 1966 P. THREADGOLD ET AL 3,262,050
GUARD ELECTRODE TYPE METHOD AND APPARATUS FOR LOGGING BOREHOLES
WITH SWITCH MEANS FOR ALTERING THE EFFECTIVE
DEPTH OF PENETRATION OF THE CURRENT
FROM THE MEASURING ELECTRODE
Filed Feb. 20, 1963 4 Sheets-Sheet 1
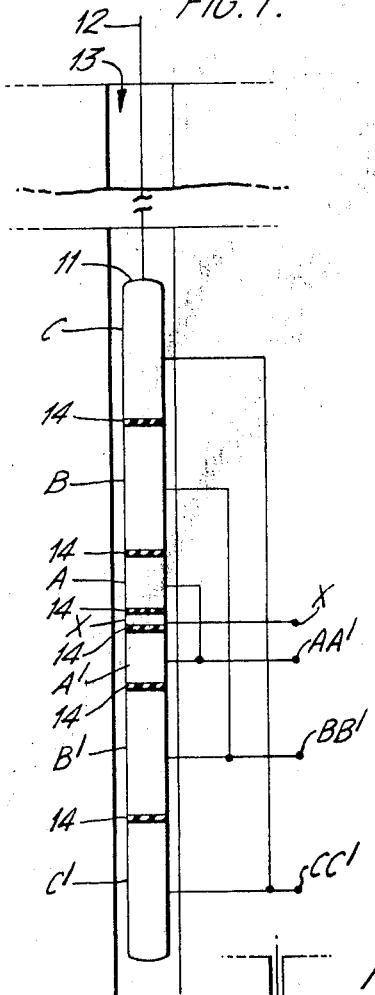
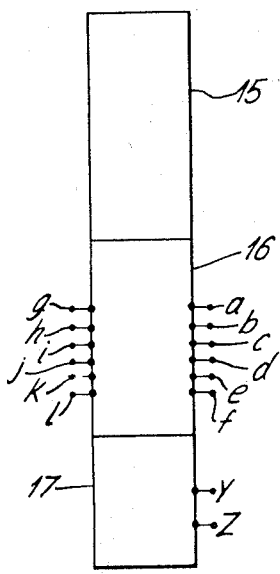
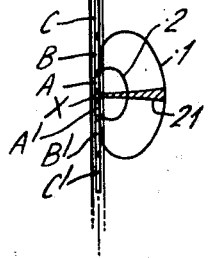
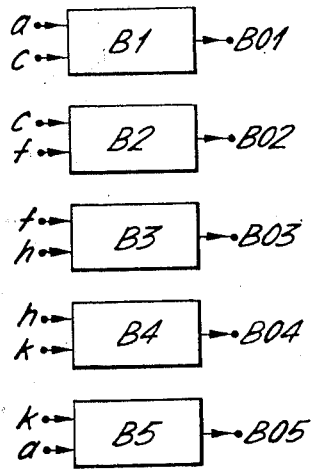
INVENTORS:
PHILIP THREADGOLD
GODFREY S. THOMAS
BY: Morgan, Finnegan, Durham & Pine
ATTORNEYS

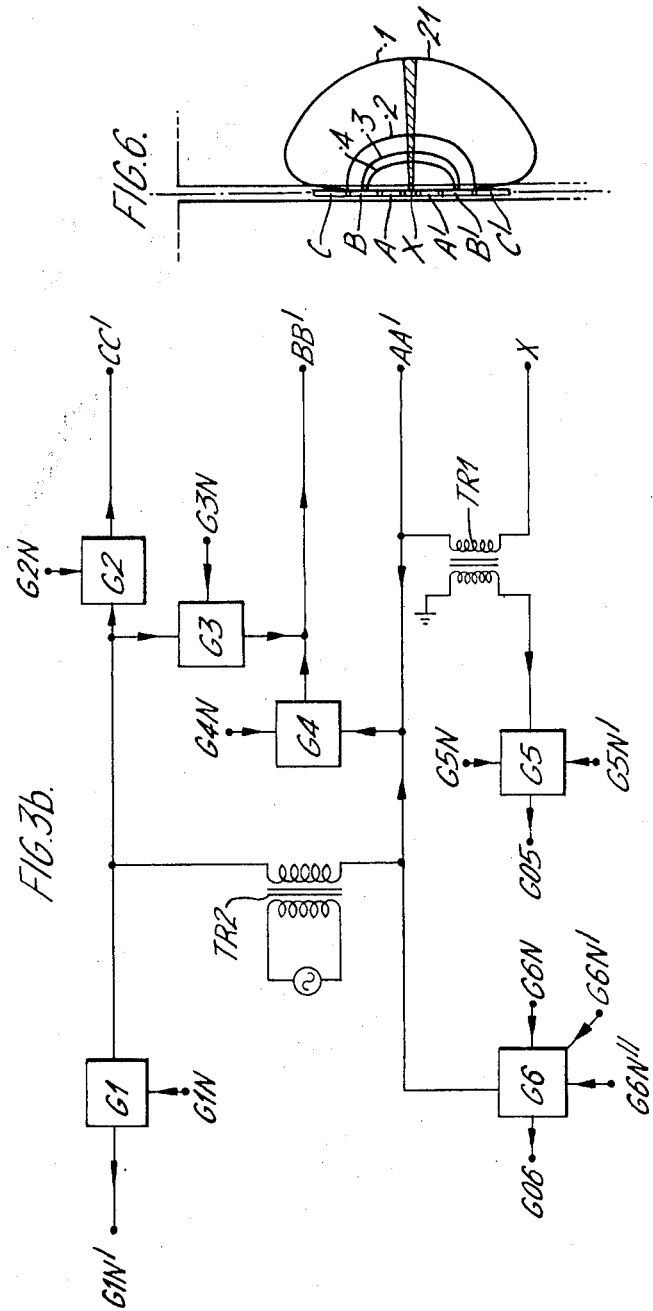

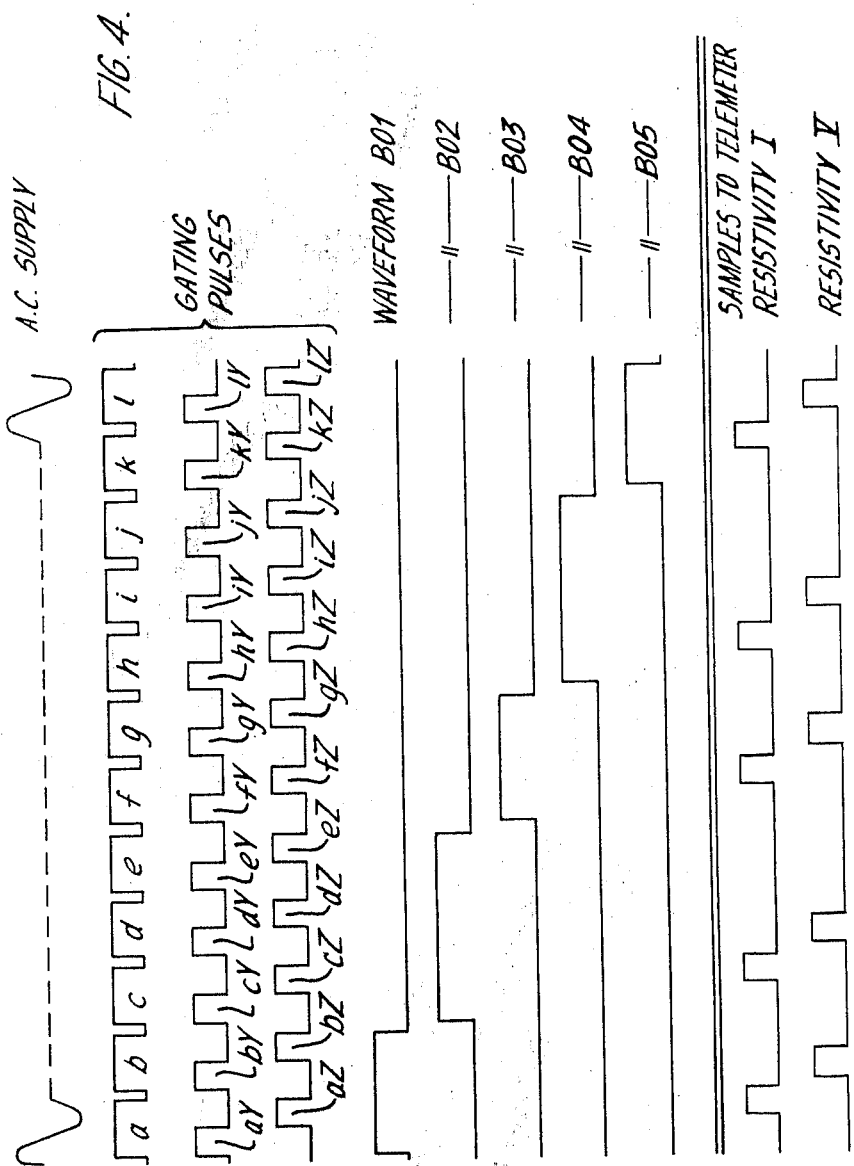

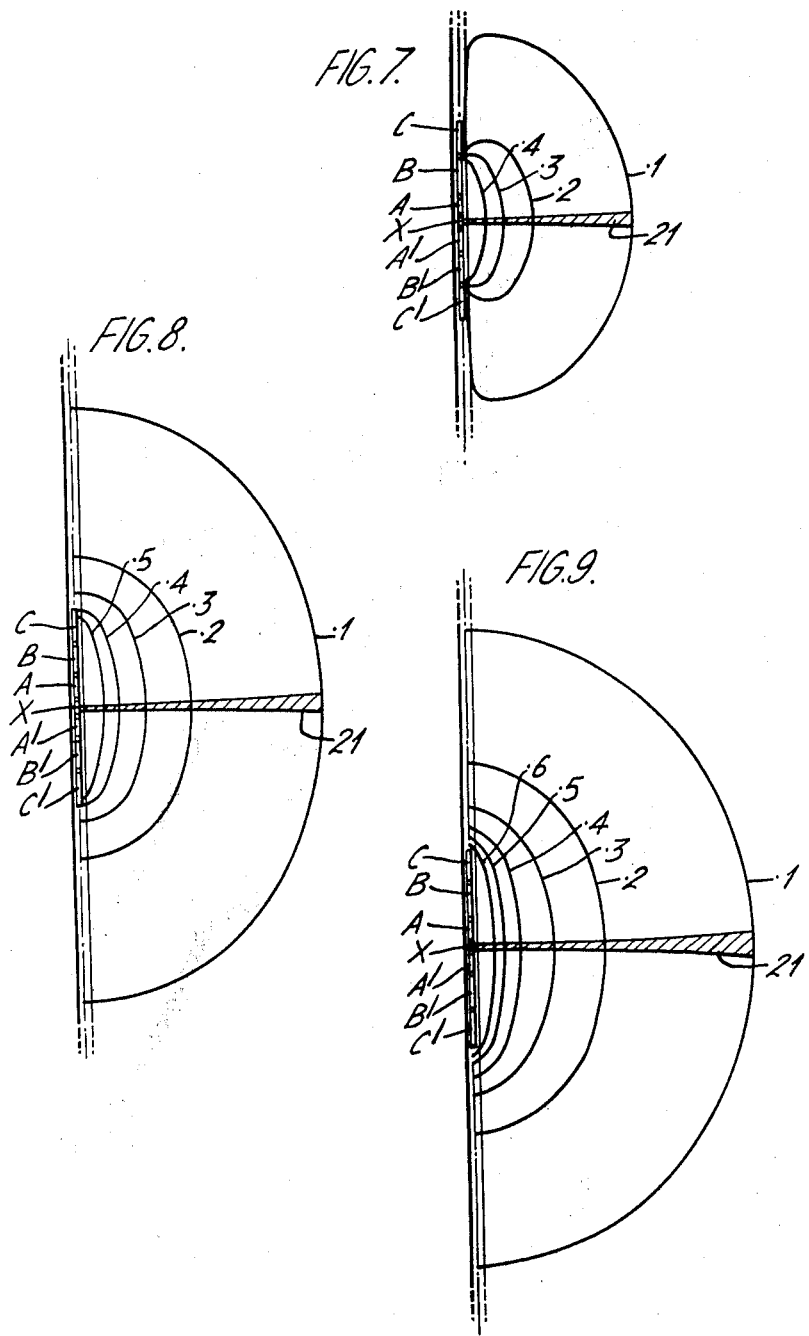

United States Patent Office 3,262,050
Patented July 19, 1966

3,262,050
GUARD ELECTRODE TYPE METHOD AND APPARATUS FOR LOGGING BOREHOLES WITH SWITCH MEANS FOR ALTERING THE EFFECTIVE DEPTH OF PENETRATION OF THE CURRENT FROM THE MEASURING ELECTRODE
Philip Threadgold and Godfrey Stuart Thomas, Sunbury-on-Thames, England, assignors to The British Petroleum Company Limited, London, England, a British joint-stock corporation
Filed Feb. 20, 1963, Ser. No. 259,999
Claims priority, application Great Britain, Feb. 28, 1962, 7,829/62, 7,830/62
9 Claims. (Cl. 324—10)

This invention relates to a method of and apparatus for logging boreholes.

Electric logging measurements are carried out in boreholes for several purposes, the more important being the identification of porous permeable strata containing oil or gas, and also the estimation of the quantity of oil or gas present in the strata. The measurement of formation resistivity is of fundamental importance in this respect.

In current drilling practice, a "drilling mud" is used which is usually a chemically treated aqueous fluid. One of the objects of the mud is to provide a hydrostatic pressure to counteract the pressure of the formation fluids, to prevent them from flowing into the borehole. The mud gravity is controlled such that the pressure due to the mud column is slightly higher than the formation fluid pressure. The mud therefore invades any porous permeable strata and flushes the formation fluid away from the walls of the borehole. During this invasion process solid particles in the mud are deposited on the borehole wall as mud cake or sheath.

Any instrument which is required to measure the true formation resistivity must have a sufficiently deep investigation characteristic so that its response due to the mud in the borehole and the invaded zone is small compared with the response due to the virgin formation. In addition the instrument should have a focussing action in the vertical plane to minimize the effects of adjacent beds of different resistivity.

Several methods of measuring the formation resistivity are known in the art, one of these being the use of a logging sonde of the "guard electrode," type. The guard electrode type of logging sonde has a measuring electrode located centrally in, and electrically insulated from, the main body thereof, the main body on each side of the measuring electrode forming the guard electrode. The measuring and guard electrodes are held at equal potentials while current is emitted into the strata from both electrodes. The sonde is arranged to have a large overall length with respect to the length of the measuring electrode. With this arrangement the current emitted from the measuring electrode passes into the adjacent strata for a considerable depth in the form of a focussed sheet; in a plane perpendicular to the longitudinal axis of the sonde. The value of the current emitted from the measuring electrode and the values of the equal potentials are measured and divided to give an indication of the resistivity of the disc of formation surrounding the measuring electrode. These measurements are continuously recorded over the length of the borehole being investigated to produce a resistivity log thereof.

In addition to obtaining values of the resistivity of the true formation, which has not been invaded by the mud, the resistivity of the thin annulus immediately surrounding the borehole wall is also required to be measured. This is usually effected by devices using electrode systems having a geometry such that the response is affected mainly by the material within a few inches from the electrodes, the electrodes often being mounted on pads which are held against the borehole wall.

A complete resistivity survey of a borehole should preferably include at least one investigation at a medium depth of penetration into the strata. This medium investigation should measure the resistivity of the formation between the two extremes mentioned above, and is useful in estimating the validity of the resistivity value obtained for the true formation.

In current electric logging practice medium and deep investigation curves can be obtained in one logging run. The shallow investigation curve is obtained in a further run using a sonde with the electrodes held against the borehole wall, as previously described.

According to one aspect of the present invention we provide a method of logging a borehole which comprises running a logging sonde, of the guard electrode type having a measuring electrode and a plurality of further electrically insulated electrodes spaced along its length, along a borehole containing a conducting fluid, investigating the formations past which the sonde moves by means of a thin focussed electric current sheet emitted from the measuring electrode in the logging sonde, varying the effective investigation depth of penetration into the strata surrounding the borehole of the focussed electric current sheet by selectively switching the plurality of further electrodes to emit or receive current, maintaining the measuring electrode and guard electrodes emitting current at substantially equal potentials, and measuring the value of the electric current emitted from the measuring electrode and measuring the value of said equal potentials for each of said switching configurations to obtain a resistivity log of each of said investigation depths.

Preferably the electrodes are arranged symmetrically on each side of the measuring electrode, corresponding electrodes on each side of the measuring electrode being connected to form pairs, and these pairs of electrodes being selectively switched to emit or receive current to vary the said investigation depth of the focussed electric current sheet.

According to a further aspect of the present invention we provide apparatus for logging a borehole comprising a logging sonde of the guard electrode type, wherein the sonde is provided with a measuring electrode and a plurality of further electrodes, spaced along its length, which are electrically insulated from each other, and with switching means to selectively switch the further electrodes so as to emit or receive current, the connections being such that when the further electrodes are connected to emit current they are held substantially at potentials equal to that of the measuring electrode whereby, in use, a resistivity log of the strata surrounding a borehole can be obtained for each of a selected plurality of effective investigation depths of penetration by a focussed electric current sheet emitted from the measuring electrode, into the formations surrounding the borehole.

In the following description and claims the term "quiescent" means not connected to emit or receive current.

In order that the invention can be more easily understood, a specific embodiment, by way of example only, will now be described with reference to the accompanying drawings, in which:

FIGURE 1 shows a diagrammatic representation of a logging sonde located down a borehole.

FIGURE 2 shows a block schematic representation of a telemetering system contained in the sonde of FIGURE 1.

FIGURES 3a and 3b show a block schematic representation of the electronic circuitry for producing the switching configurations of the electrodes of the sonde of FIGURE 1.

FIGURE 4 shows a flow diagram giving the timing sequence of events in the circuitry of FIGURES 2 and 3.

FIGURES 5, 6, 7, 8 and 9 show diagrammatically, the equipotential surfaces and zone of investigation of the current sheet, with the electrodes of the sonde of FIGURE 1 in each of their switched configurations.

Referring firstly to FIG. 1 there is shown a sonde 11 suspended by a cable 12 down a bore-hole 13. The sonde 11 comprises a centrally positioned measuring electrode X and three pairs of electrodes AA', BB' and CC', with each of the pairs of electrodes positioned symmetrically about the measuring electrode X. The measuring electrode X and all the other electrodes are electrically insulated from each other by thin insulating spacers 14.

The electrodes X, AA', BB' and CC' are shown connected to similarly referenced terminals external to the sonde 11. In practice these terminals are inside the sonde, and have been shown external for ease of drawing. The terminals X, AA', BB' and CC' are connected to similarly referenced terminals in FIGURE 3b.

Referring now to FIG. 2 there is shown generally in block 15 a 24-channel telemetering system. This system is described in detail in United Kingdom patent specification 908,467 and will therefore not be described in detail herein. Unit 16 comprises a 12-pulse clock unit having outputs referenced, $a$, $b$, $c$, $d$, $e$, $f$, $g$, $h$, $i$, $j$, $k$ and $l$. Unit 17 is a bi-stable device connected to the 12 pulse clock 16 to produce two pulses at terminals Y and Z for each of the twelve pulses produced by the clock 16.

FIG. 3a shows five bi-stable units referenced B1–B5. Each unit has input terminals similarly referenced to some of the output terminals of the clock 16 (FIG. 2) to which they are connected. Bi-stable units B1–B5 each have output terminals referenced BO1–BO5 respectively. FIG. 3b shows six gate units referenced G1–G6 respectively. These gates are connected to provide the switching configurations of the terminals and hence electrodes X, AA', BB' and CC' of the sonde (FIG. 1), which terminals are connected to the similarly referenced terminals in FIG. 3b. The operation of FIGS. 3a and 3b to produce the switching configuration will be described with the aid of FIG. 4 which shows the timing sequence of the operations. In FIG. 4 the pulses referenced $aY$ to $lZ$ represent gating pulses produced by using the combinations of the outputs of units 16 and 17, FIG. 2.

The waveforms referenced BO1–BO5 represent the timing sequence of the switching configurations of the electrodes X, AA', BB', CC'. Waveform BO1 represents the time during which electrodes X and AA' are emitting current, CC' are receiving current and electrodes BB' are quiescent. Waveform BO2 represents the time during which electrodes X, AA' and BB' are emitting current and electrodes CC' are quiescent. Waveform BO3 represents the time during which electrodes X and AA' are emitting current and BB' and CC' are receiving current. Waveform BO4 represents the time during which electrodes X, AA', BB' are emitting current and electrodes CC' are receiving current. Waveform BO5 represents the time during which all electrodes are emitting current to remote earth. These waveforms BO1 to BO5 occur at the outputs BO1–BO5 of the bi-stable units B1–B5, FIG. 3a.

The waveforms referenced Resistivity I and Resistivity V show the timing sequences for the sampling of the current emitted from measuring electrode and the voltage of the electrodes.

Input terminal G1N of gate unit G1 is connected to output terminals BO2 and BO5 of bi-stable units B2 and B5 respectively. Input terminal G1N' is connected to a further remote earth electrode (not shown). Input terminal G2N of gate unit G2 is connected to the output terminals BO1, BO3 and BO4 of bi-stable units B1, B3 and B4 respectively. Input terminal G3N of gate unit G3 is connected to output terminals BO3 and BO5 of bi-stable units B3 and B5 respectively. Input terminal G4N of gate unit G4 is connected to output terminals BO2, BO4 and BO5 of bi-stable units, B2, B4 and B5 respectively. Input terminal G5N of gate unit G5 is connected to output terminals, $a$, $c$, $f$, $h$ and $k$ of clock unit 16, FIG. 2.

Input terminal G5N' of gate unit G5 is connected to output terminal Z of unit 17. Output terminal GO5 of gate unit G5 is connected to an input terminal (not shown) of telemeter unit 15. Input terminal G6N of gate unit G6 is connected to output terminals $b$, $d$, $g$, $i$ and $l$ of unit 16. Input terminal G6N' of unit G6 is connected to output terminal Y of unit 17. Output terminal GO6 is connected to a further input terminal (not shown) of telemeter unit 15.

Input terminal G6N'' of gate unit G6 is connected to a remote earth electrode (not shown on any drawing). It should, of course, be realised that although these connections have been described as being direct connections, they are in fact connected by further circuit means to prevent cross talk.

Transformer TR1 represents a means for measuring the intensity of the current emitted from electrode X. Transformer TR2 represents a means for supplying alternating electrical energy to the electrodes. The switching configuration obtained during time sequence BO1 will now be described in detail.

An output pulse is produced at output terminal BO1 of bi-stable unit B1 of duration dependent upon the input pulses on input terminals $a$ and $c$ which are connected to similarly referenced terminals on unit 16. The output from BO1 is fed to the input terminal G2N of gate G2 to complete the circuit for the supply to be fed between electrodes CC' and AA'. Current also flows from the connections to electrodes AA' through the low impedance primary winding of transformer TR1 through electrode X. The current emitted from electrode X is caused to be sampled by gate G5 being opened due to an input on the input terminal G5N derived from output terminal $a$ of unit 16 and an input on input terminal G5N' derived from output terminal Z of unit 17.

A signal dependent on the value of the sampled current is fed from the output terminal GO5 of gate unit G5 to the telemeter unit 15.

The potential between electrodes AA' and the remote earth electrode is caused to be sampled by an input on input terminal G6N of gate unit G6 derived from output terminal $b$ of unit 16 and an input to input terminal G6N' of gate unit G6 derived from output terminal Y of unit 17.

An output signal representative of the value of the sampled voltage is fed from output terminal GO6 of gate unit G6 to telemeter unit 15. The other switching configurations of the electrodes X, AA', BB', CC' as hereinbefore described with reference to FIG. 4 follow from the description of the switching configuration for time BO1 and therefore will not be fully described.

The effective distance the focussed current sheet penetrates into the strata is dependent upon the dimensions of the electrodes, and the variations of penetration depth dependent on the number of guard electrodes provided in the sonde. Although three pairs of electrodes have been shown in the specific embodiment it is not intended that the invention should be limited to three pairs.

A laboratory model simulating a sonde ten feet long has been made and tested. In the case with measuring electrode X and electrode pair AA' emitting current and pairs BB' and CC' receiving, with an effective sonde length of ten feet a depth of penetration of approximately three feet was obtained. This is represented in FIG. 5 in which the shaded area 21 represents the focussed current sheet emitted from the measuring electrode X and the lines .1 and .2 represent the equipotential surfaces of .1V and .2V respectively, where V is the potential of measuring electrode X and guard electrodes AA', and electrode pairs BB' and CC' are at zero potential. For comparison purposes the volume of strata of which the resistivity is measured is taken to be that contained by the current sheet and the O.IV equipotential surface.

FIGURE 6 shows a similar representation to FIG. 5 with the AA' pair of electrodes and measuring electrode X emitting current, the CC' pair of electrodes receiving current, and the BB' pair quiescent. In this figure the .IV to .4V equipotential lines are shown referenced .1 to .4 respectively. In this case the effective penetration depth of the focussed current sheet 21 (from the sonde to the .IV equipotential surface) was approximately six feet.

FIGURE 7 shows a similar representation to FIGS. 5 and 6 with AA' and BB' pairs of electrodes and the measuring electrode X emitting current and the CC' pair of electrodes receiving current. In this figure the .1V to .4V equipotential surfaces are shown referenced .1 to .4 respectively. In this case the effective penetration depth of the focussed current sheet 21 (from the sonde to the .1V equipotential surface) was approximately nine feet.

FIGURE 8 shows a similar representation to FIGS. 5 to 7 with electrode pairs AA' and BB' and measuring electrode X emitting current and pair CC' quiescent. In this figure the .1V to .5V equipotential surfaces are shown referenced .1 to .5 respectively. In this case the effective penetration depth of the focussed current sheet 21 was approximately twelve feet.

Finally FIGURE 9 shows a similar representation to FIGS. 5 to 8 with all electrodes emitting current. In this figure the .1V to .6V equipotential surfaces are shown referenced .1 to .6 respectively. In this case the effective penetration depth of the focussed current sheet 21 was approximately fifteen feet.

Hence it can be seen from the above that by varying the number and size of the electrodes many variations of effective penetration depth can be obtained.

With a sonde of the type described above, a number of resistivity logs of a borehole can be obtained continuously, by carrying out the above described switching cycle as the sonde is moved through the borehole during a logging run.

We claim:
1. A method of measuring, at various penetration depths, the electrical resistivities of earth formations traversed by a borehole containing an electrically conductive fluid, which comprises the steps of
   locating within the borehole a symmetrical vertical structure including a measuring electrode flanked by a pair of guard electrodes and by at least one pair of electrodes spaced outside the guard electrodes,
   connecting said measuring electrode and each of said guard electrodes to one terminal of a source of electric current whereby they are at substantially equipotential and all emit current to said ground formations
   and then selectively during different periods of time,
      connecting said pair of further electrodes to said one terminal of said source to cause said further electrodes also to emit current,
      connecting said pair of further electrodes to the opposite terminal of said source to cause said further electrodes to receive current and
      leaving said further pair of electrodes unconnected to cause them to be quiescent,
   thereby to alter the effective penetration depth into said earth formations of the thin focussed electric current sheet from said measuring electrode during said different periods of time and
   measuring the respective values of the current emitted via said measuring electrode in each of said different periods of time to obtain a plurality of resistance measurements each for a different penetration depth of said current sheet.

2. The method according to claim 1 wherein said symmetrical vertical structure further includes a second pair of further electrodes positioned outside the first pair of further electrodes and said method further comprises the steps of connecting said pairs of further electrodes to said source so that during one of said periods of time the first pair of further electrodes is emitting current and the second pair is receiving current, during another of said periods of time both of said first and second pairs of electrodes are emitting current while in yet another of said periods of time both of said first and second pairs of electrodes are receiving current.

3. The method according to claim 1 wherein said symmetrical vertical structure further includes a second pair of further electrodes positioned outside the first pair of further electrodes and in which during the first of five successive periods of time said second pair of further electrodes is connected to receive current and said first pair of further electrodes is held quiescent, during the second of said five periods said first pair of further electrodes is connected to emit current, said second pair of further electrodes is held quiescent and said opposite terminal of said source is connected to a remote connection to said earth formation, during the third of said five periods each of said first and second pairs of further electrodes is connected to receive current, during the fourth of said five periods said first pair of further electrodes is connected to emit current and said second pair of further electrodes is connected to receive current and in the fifth of said five periods each of said first and second pairs of further electrodes is connected to emit current while said opposite terminal of said source is connected to a remote connection to said earth formation.

4. The method according to claim 1 wherein all values of the current measured with the apparatus in a selected circuit configuration are recorded on the same channel of a multi-channel recording device.

5. Apparatus for the electrical resistance logging of a borehole filled with a conductive fluid and located in an earth formation, which comprises a sonde provided with a measuring electrode intermediate its length, a pair of electrically interconnected guard electrodes disposed immediately adjacent to, one above and the other below, said measuring electrode, and electrically insulated therefrom, and at least one pair of further electrodes disposed one above and the other below said measuring electrode on the sides of said guard electrodes opposite those adjacent said measuring electrode, said further electrodes being electrically insulated from said guard electrodes and said measuring electrode; a power supply source having first and second terminals; current measuring means; potential measuring means connected to said measuring electrode; electrical connections from said first terminal of said power source to each of said guard electrodes and through said current measuring means to said measuring electrode; a remote connection to said earth formation; multiple position electric switch means interconnected with said further electrodes, said first and second terminals of said power source and said remote ground connection, said multiple position switch means being effective in one switching position to connect said pair of further electrodes also to said first terminal of said power source and said second terminal of said power source to said remote earth connection, in another of its switching positions to connect said pair of further electrodes to the second terminal of said power source and in a further one of its switching positions to leave said pair of further electrodes unconnected.

6. Apparatus in accordance with claim 5 further comprising a multiple channel recording device and means for connecting said current and potential measuring means to a selected channel of said recording device according to the position of said switch means.

7. Apparatus for the electrical resistance logging of a borehole filled with a conductive fluid and located in an earth formation which comprises a sonde having a plurality of coaxial electrodes including
- a measuring electrode intermediate its length,
- a pair of electrically interconnected guard electrodes symmetrically disposed adjacent said measuring electrode,
- a first pair of electrically interconnected further electrodes symmetrically disposed adjacent said guard electrodes, and
- a second pair of electrically interconnected further electrodes symmetrically disposed adjacent said first pair of further electrodes;

a power supply source having first and second terminals;

switching means having three switching configurations for providing three different effective investigation depths into formations surrounding said borehole including
- a first switching configuration for producing a short depth of penetration wherein said measuring electrode and guard electrodes are connected to said first terminal to emit current and said first and second further pairs of electrodes are connected to said second terminal to receive current,
- a second switching configuration for producing medium effective depth of penetration wherein said measuring electrode, guard electrodes and first pair of further electrodes are connected to said first terminal to emit current and said second pair of further electrodes are connected to said second terminal to receive current, and
- a third switching configuration for producing deep effective depth of penetration wherein all of said electrodes are connected to said first terminal to emit current and said second terminal is coupled to a remote earth connection; and current measuring means connected to measure current flow through said measuring electrode.

8. Apparatus in accordance with claim 7 wherein said switching means has additional switching configurations to provide two different investigation depths of penetration including
- a fourth switching configuration for producing effective depth of penetration between the short and medium depths wherein said measuring electrode and guard electrodes are connected to said first terminal to emit current, said second pair of further electrodes is connected to said second terminal to receive current and said first pair of further electrodes is quiescent, and
- a fifth switching configuration for producing an effective depth of penetration between the medium and deep depths of penetration wherein said measuring electrode, guard electrodes and first pair of further electrodes are connected to said first terminal to emit current, said second pair of further electrodes is quiescent, and said second terminal is coupled to a remote earth connection.

9. Apparatus in accordance with claim 8 further comprising voltage measuring means connected to said measuring electrode.

References Cited by the Examiner

UNITED STATES PATENTS

| | | | |
|---|---|---|---|
| 2,712,630 | 7/1955 | Doll | 324—1 |
| 2,728,047 | 12/1955 | Doll | 324—1 |
| 2,986,693 | 5/1961 | Alder | 324—1 |
| 3,096,477 | 7/1963 | Smith et al. | 324—1 |

WALTER L. CARLSON, *Primary Examiner.*

G. R. STRECKER, *Assistant Examiner.*